(12) United States Patent
Yoneya et al.

(10) Patent No.: US 10,808,630 B2
(45) Date of Patent: Oct. 20, 2020

(54) CONTROL DEVICE FOR INTERNAL COMBUSTION ENGINE

(71) Applicant: HITACHI AUTOMOTIVE SYSTEMS, LTD., Hitachinaka-shi, Ibaraki (JP)

(72) Inventors: Naoki Yoneya, Chiyoda-ku (JP); Masayuki Saruwatari, Hitachinaka (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 0 days.

(21) Appl. No.: 16/485,849

(22) PCT Filed: Jan. 31, 2018

(86) PCT No.: PCT/JP2018/003101
§ 371 (c)(1),
(2) Date: Aug. 14, 2019

(87) PCT Pub. No.: WO2018/179801
PCT Pub. Date: Oct. 4, 2018

(65) Prior Publication Data
US 2020/0056553 A1    Feb. 20, 2020

(30) Foreign Application Priority Data
Mar. 29, 2017   (JP) .................................. 2017-064160

(51) Int. Cl.
*F02D 15/00*        (2006.01)
*F02D 43/00*        (2006.01)
(Continued)

(52) U.S. Cl.
CPC .............. *F02D 15/00* (2013.01); *F02D 41/02* (2013.01); *F02D 43/00* (2013.01); *F02D 45/00* (2013.01); *F02M 26/06* (2016.02); *F02P 5/153* (2013.01)

(58) Field of Classification Search
CPC ................. F02D 13/0269; F02D 15/00; F02D 2200/0404; F02D 2200/0406;
(Continued)

(56) References Cited

U.S. PATENT DOCUMENTS

| 4,984,546 A | * | 1/1991 | Shimomura | .......... F02D 35/023 123/406.23 |
| 2005/0092297 A1 | * | 5/2005 | Takemoto | ............. F02D 41/401 123/406.47 |

(Continued)

FOREIGN PATENT DOCUMENTS

| JP | H01-216074 A | 8/1989 |
| JP | 2001-082303 A | 3/2001 |

(Continued)

OTHER PUBLICATIONS

JP 2007-291977 Nov. 8, 2007, Akasaki et al. (machine translation).*
(Continued)

*Primary Examiner* — Phutthiwat Wongwian
*Assistant Examiner* — Diem T Tran
(74) *Attorney, Agent, or Firm* — Foley & Lardner LLP (57) ABSTRACT

There is a problem of a difficulty in estimating the temporal change of the MBT for each of cylinders with light calculation load and high accuracy. An object of the present invention is to provide a control device capable of detecting a temporal change in the fuel efficiency optimum ignition timing (MBT) for each of cylinders. Therefore, the control device for internal combustion engine includes a control unit (CPU) that estimates an optimum ignition timing of each of
(Continued)

cylinders from the relationship between the phase angle ($\theta$Tmax) at which the torque peaks and the phase angle ($\theta$Pmax) at which the in-cylinder pressure peaks with respect to the ignition timing of the cylinder.

7 Claims, 7 Drawing Sheets

(51) Int. Cl.
    *F02D 41/02*     (2006.01)
    *F02M 26/06*     (2016.01)
    *F02D 45/00*     (2006.01)
    *F02P 5/153*     (2006.01)

(58) Field of Classification Search
    CPC ............. F02D 2200/101; F02D 35/023; F02D 41/009; F02D 41/12; F02D 43/00; F02D 45/00; F02D 41/02; F02M 26/06; F02P 5/15; F02P 5/153; Y02T 10/46
    See application file for complete search history.

(56) References Cited

U.S. PATENT DOCUMENTS

| | | | |
|---|---|---|---|
| 2009/0017987 A1* | 1/2009 | Satou | ................. F02D 35/02 |
| | | | 477/102 |
| 2012/0125295 A1 | 5/2012 | Senda | |
| 2015/0152804 A1 | 1/2015 | Sakayanagi | |

FOREIGN PATENT DOCUMENTS

| | | | |
|---|---|---|---|
| JP | 2001-098991 A | | 4/2001 |
| JP | 2007291977 | * | 11/2007 |
| JP | 2007-332934 A | | 12/2007 |
| JP | 2010-001745 A | | 1/2010 |
| JP | 2012-112253 A | | 6/2012 |
| WO | WO-2014/002189 A1 | | 5/2016 |

OTHER PUBLICATIONS

International Search Report with English translation and Written Opinion issued in corresponding application No. PCT/JP2018/003101 dated May 15, 2018.

\* cited by examiner

CONTROL DEVICE FOR INTERNAL COMBUSTION ENGINE

TECHNICAL FIELD

The present invention relates to a control device that controls an internal combustion engine.

BACKGROUND ART

There has been conventionally known a gasoline engine that forms an air-fuel mixture in cylinders and burns the same by ignition or auto-ignition. As a technique for improving the thermal efficiency of this type of engine, there is widely known a lean combustion technique by which to burn an air-fuel mixture in which fuel is thinner than the theoretical air-fuel ratio. Performing lean combustion improves the theoretical thermal efficiency due to the increase of the specific heat ratio of the air-fuel mixture and improves the indicated thermal efficiency due to the decrease of pump loss.

By thinning the fuel in the air-fuel mixture (leaning), the thermal efficiency is further improved. At the same time, however, the combustion fluctuation due to the decrease of the combustion speed becomes large and there is a limit air-fuel ratio (lean limit) at which stable combustion is possible. The lean limit is determined by the engine specifications such as the shape of the combustion chamber and the ignition device. The lean limit is stored in advance for each operating condition, and parameters such as air-fuel ratio and ignition timing are controlled during operation to optimize fuel consumption within that range.

On the other hand, in an actual engine, there occur variations among the cylinders in the flow of the air-fuel mixture, and the uniformity of the air-fuel mixture varies among the cylinders. In a general engine, the ignition timing is set to be the same for all the cylinders, and thus some of the cylinders are not ignited at optimum fuel efficiency ignition timing (hereinafter, referred to as MBT). Therefore, it is necessary to take a margin of the control value and use the air-fuel ratio shifted to the fuel thicker side (richer side) as the control target, which will deteriorate the fuel efficiency accordingly.

JP 2010-1745 A (Patent Literature 1) describes a background art related to cylinder-by-cylinder ignition timing control of such an internal combustion engine. According to this technique, the average torque is determined by a torque detector at different ignition timings among cylinders, and the ignition timing at which the average torque becomes maximum is determined for each of the cylinders.

JP 2012-112253 A (Patent Literature 2) describes that the ignition timing is controlled for each of cylinders by changing the ignition timing, acquiring torque by a torque detector, and bringing a crank angle at which the combustion pressure obtained by subtracting motoring torque becomes peak closer to a peak crank angle of a combustion pressure at the time of combustion at an MBT stored in advance.

CITATION LIST

Patent Literature

PTL 1: JP 2010-1745 A
PTL 2: JP 2012-112253 A

SUMMARY OF INVENTION

Technical Problem

In an actual engine, there occur variations among cylinders in the flow of the air-fuel mixture, and the uniformity of the air-fuel mixture varies among the cylinders. If the uniformity varies, the air-fuel ratio around the spark plug fluctuates, which affects the ignition and flame propagation of the air-fuel mixture. For example, when the air-fuel ratio around the plug becomes lean, the combustion speed decreases and thus the angle changes closer to the advance side than MBT. In addition, the uniformity variations among the cylinders also depend on the condition of the inner wall of the intake pipe. Thus, the MBT changes to the advance side when the flow of the air-fuel mixture is weakened due to temporal changes such as the adhesion of fuel deposits.

In a general engine, the ignition timing is pre-stored to be the same among all the cylinders, so that some of the cylinders are not ignited at the fuel efficiency optimum ignition timing due to the cylinder variations. Here, when combustion control is performed in a region close to the lean limit, there is a possibility that some of the cylinders may be misfired due to the uniformity variation.

For example, when the air-fuel ratio around the plug is leaned only in a certain cylinder during operation at the very lean limit, the ignition advance amount in the cylinder cannot compensate for the decrease in the combustion speed, which leads to unstable combustion or a misfire. Therefore, it is necessary to take a margin of the control value and use the air-fuel ratio shifted to the fuel thicker side (richer side) at which combustion is stable as the control target, which will deteriorate the fuel efficiency accordingly.

However, according to the technique described in Patent Literature 1 mentioned above, the accurate detection of torque required to judge MBT needs additional sensors such as a torque detector and an in-cylinder pressure sensor. In addition, it is necessary to measure the torque at each crank angle to obtain the average torque, which will increase the necessary memory area. According to the technique described in Patent Literature 2 mentioned above, the peak position of the combustion pressure at the time of MBT combustion is pre-stored as a fixed value, which makes it impossible to follow MBT changes caused by time deterioration of the engine.

As described above, there is a problem of a difficulty in estimating the temporal change of the MBT for each of cylinders with light calculation load and high accuracy.

An object of the present invention is to provide a control device capable of detecting a temporal change in the fuel efficiency optimum ignition timing (MBT) for each of cylinders.

Solution to Problem

As an example of a solution to the above problem, the optimum ignition timing of each of cylinders is estimated from the relationship between a phase angle ($\theta$Tmax) at which the torque peaks and a phase angle ($\theta$Pmax) at which the in-cylinder pressure peaks with respect to the ignition timing of the cylinder.

Advantageous Effects of Invention

According to the present invention, it is possible to perform MBT combustion in all cylinders, and obtain the effect of reducing fuel consumption due to a reduction in the control margin at the time of lean combustion. Other configurations, operations, and effects of the present invention will be described in detail in relation to the following examples.

DESCRIPTION OF EMBODIMENTS

Examples of the present invention will be described below with reference to the drawings.

First Example

A configuration and operations of a control device for engine according to a first example of the present invention will be described below with reference to FIGS. 1 to 6.

Figure 1:
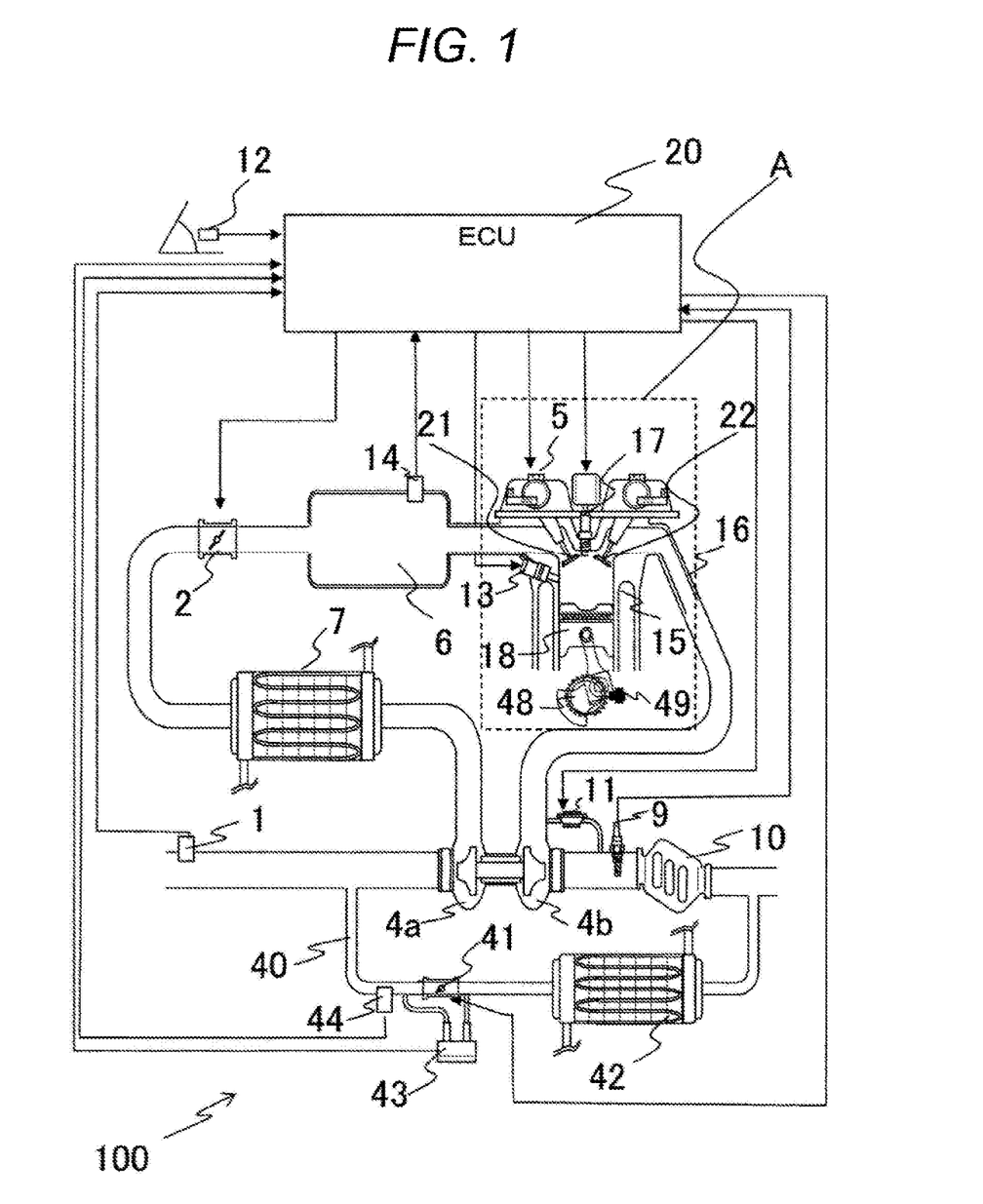
FIG. 1 is a system configuration diagram of an in-cylinder injection gasoline engine for automobile to which a control device for engine according to a first example of the present invention is applied.
Figure 2:
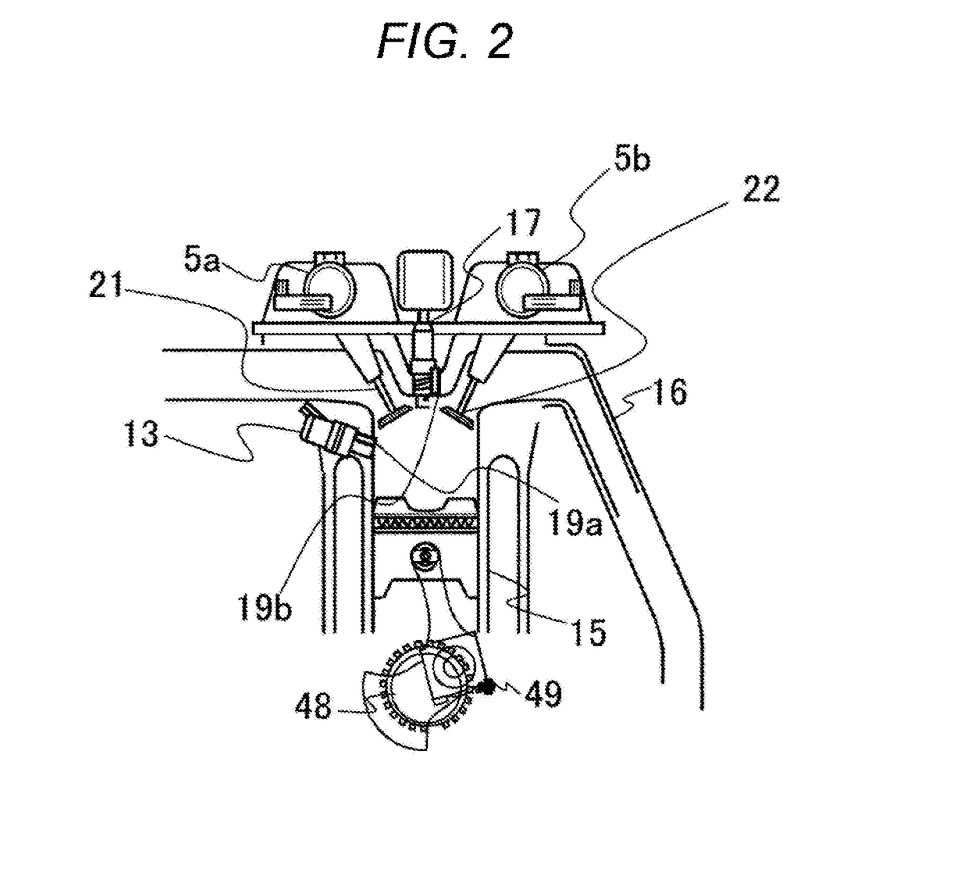
FIG. 2 is an enlarged view of a cylinder and its vicinity in the control device for engine according to the first example of the present invention.

FIG. 1 is a system configuration diagram of an in-cylinder injection gasoline engine for automobile to which the control device for engine according to the first example of the present invention is applied. FIG. 2 is an enlarged view of a cylinder part. An engine 100 is a four-cylinder gasoline engine for automobile that performs spark-ignited combustion.

The engine 100 includes: an air flow sensor 1 that measures an intake air amount; a compressor 4a for a supercharger that oversupplies intake air; an intercooler 7 that cools the intake air; an electronically controlled throttle 2 that adjusts the pressure in the intake pipe 6; and an intake pressure sensor 14 that measures the pressure in the intake pipe 6, all of which are provided on the intake pipe 6. The engine 100 also includes for each of cylinders 15: a fuel injection device (hereinafter called injector) 13 that injects fuel into the cylinder 15; a piston 18 that compresses a mixture of injected fuel and air; and a spark plug 17 that supplies ignition energy.

Further, as illustrated in FIG. 2, in the present example, an in-cylinder pressure sensor 19a is provided at the tip of the injector 13 to measure the in-cylinder pressure. The in-cylinder pressure sensor 19a is not necessarily attached to the injector 13. For example, the in-cylinder pressure sensor 19a may be integrated with another device such as the spark plug 17 or may be singly attached to the cylinder 15. Further, the cylinder head is provided with variable valve timing mechanisms 5a (intake side) and 5b (exhaust side) to adjust the flow rate of gas flowing into and out of the cylinder. The variable valve timing mechanisms 5a and 5b adjust the opening and closing timings for the intake valves 21 and the exhaust valves 22 of all the cylinders from the first to fourth cylinders, thereby to adjust the intake amount and the internal EGR amount. Although not illustrated, a high pressure fuel pump is disposed on the upstream side of a fuel pipe (common rail) to supply high pressure fuel to the injector 13, and the injector 13 is attached to the fuel pipe (common rail). Accordingly, the fuel pressurized to 20 MPa, for example, by the high-pressure fuel pump is accumulated in the fuel pipe (common rail), whereby the fuel is directly injected into the cylinder via the injector 13. A fuel pressure sensor is attached to the fuel pipe (common rail) to measure the internal fuel pressure (injection pressure).

The engine 100 also has a turbine 4b for applying a rotational force to the compressor 4a of the turbocharger by exhaust energy, and has an electronically controlled wastegate valve 11 for adjusting the flow rate of exhaust gas flowing into the turbine. In addition, an exhaust pipe 16 is provided with a three-way catalyst 10 that purifies exhaust gas and an air-fuel ratio sensor 9 that is a form of an air-fuel ratio detector and detects the air-fuel ratio of the exhaust gas on the upstream side of the three-way catalyst 10. Further, a crankshaft 48 is provided with a crank angle sensor 49 for calculating a rotation angle.

An EGR pipe 40 is a pipe for flowing the exhaust gas back from the downstream side of the catalyst 10 in the exhaust pipe to the upstream side of the compressor 4a in the intake pipe 6. In addition, the EGR pipe 40 has an EGR cooler 42 for cooling the EGR, an EGR valve 41 for controlling the EGR flow rate, a differential pressure sensor 43 for detecting a differential pressure between before and after the EGR valve, and an EGR temperature sensor 44 for detecting the EGR temperature in the appropriate positions.

Signals obtained from the air flow sensor 1, the air-fuel ratio sensor 9, the intake pressure sensor 14, the differential pressure sensor 43, and the EGR temperature sensor 44 are sent to an engine control unit (ECU) 20. In addition, a signal obtained from an accelerator position sensor 12 is sent to the ECU 20. The accelerator position sensor 12 detects the depression amount of an accelerator pedal, that is, the accelerator opening degree. The ECU 20 calculates the required torque based on an output signal of the accelerator position sensor 12. That is, the accelerator position sensor 12 is used as a requested torque detection sensor to detect a requested torque to the engine. The ECU 20 calculates the rotational speed of the engine based on an output signal of the crank angle sensor. The ECU 20 optimally calculates the main operation amounts of the engine, such as the air flow rate, the fuel injection amount, the ignition timing, and the fuel pressure, based on the operating conditions of the engine obtained from the outputs of the various sensors.

The fuel injection amount calculated by the ECU 20 is converted to a valve opening pulse signal and sent to the injector 13. Further, an ignition signal is sent to the spark plug 17 such that ignition can occur at the ignition timing calculated by the ECU 20. The throttle opening degree calculated by the ECU 20 is sent as a throttle drive signal to the electronically controlled throttle 2. The operation amount at a variable valve timing mechanism calculated by the ECU 20 is sent to the variable valve timing mechanism 5 (5a, 5b) as a variable valve timing mechanism drive signal. Further, the wastegate valve opening degree calculated by the ECU 20 is sent as a wastegate valve drive signal to the wastegate valve 11. The EGR valve opening degree that is constantly calculated by the ECU 20 is sent as an EGR valve opening degree drive signal to the EGR valve 41.

The injector 13 injects the fuel to the air flowing from the intake pipe 6 through the intake valve 21 into the cylinder 15, thereby to form an air-fuel mixture. The air-fuel mixture detonates by a spark generated from the spark plug 17 at a predetermined ignition timing, and the combustion pressure of the air-fuel mixture pushes down the piston to produce the driving force of the engine. Further, exhaust gas after explosion is fed into the three-way catalyst 10 through the exhaust pipe 16. Exhaust components are purified in the three-way catalyst 10 and discharged to the outside.

In an actual engine, there occur variations among cylinders in the flow of the air-fuel mixture, and the uniformity of the air-fuel mixture varies among the cylinders. If the uniformity varies, the air-fuel ratio around the spark plug fluctuates, which affects the ignition and flame propagation of the air-fuel mixture. For example, when the air-fuel ratio around the plug becomes lean, the combustion speed decreases, so the minimum advance for the best torque (MBT) changes to a more advance side. The MBT is an ignition timing at which the torque is maximum when only the ignition timing is changed under the same conditions of the engine speed and the intake amount. The MBT varies depending on the operating conditions of the engine. In addition, the uniformity variations among the cylinders also depend on the condition of the inner wall of the intake pipe. Thus, the MBT changes to the advance side when the flow of the air-fuel mixture is weakened due to temporal changes such as the adhesion of fuel deposits.

In the case of an engine in which the ignition timing is pre-stored to be the same among all the cylinders, some of the cylinders are not ignited at the optimum fuel efficiency ignition timing (MBT) due to the cylinder variations. Here, when combustion control is performed in a region close to the lean limit, there is a possibility that some of the cylinders may be misfired due to the uniformity variations. For example, when the air-fuel ratio around the plug is leaned only in a certain cylinder during operation at the very lean limit, the ignition advance amount in the cylinder cannot compensate for the decrease in the combustion speed, which leads to unstable combustion or a misfire. Therefore, it is necessary to take a margin of the control value and use the air-fuel ratio shifted to the fuel thicker side (richer side) at which combustion is stable as the control target, which will deteriorate the fuel efficiency accordingly.

However, according to the technique described in Patent Literature 1 mentioned above, the accurate detection of torque required to judge MBT needs additional sensors such as a torque detector and an in-cylinder pressure sensor. In addition, it is necessary to measure the torque at each crank angle to obtain the average torque, which will increase the necessary memory area. According to the technique described in Patent Literature 2 mentioned above, the peak position of the combustion pressure at the time of MBT combustion is pre-stored as a fixed value, which makes it impossible to follow MBT changes caused by time deterioration of the engine.

As described above, there is a problem of a difficulty in estimating the temporal change of the MBT for each of cylinders with light calculation load and high accuracy.

Figure 3:
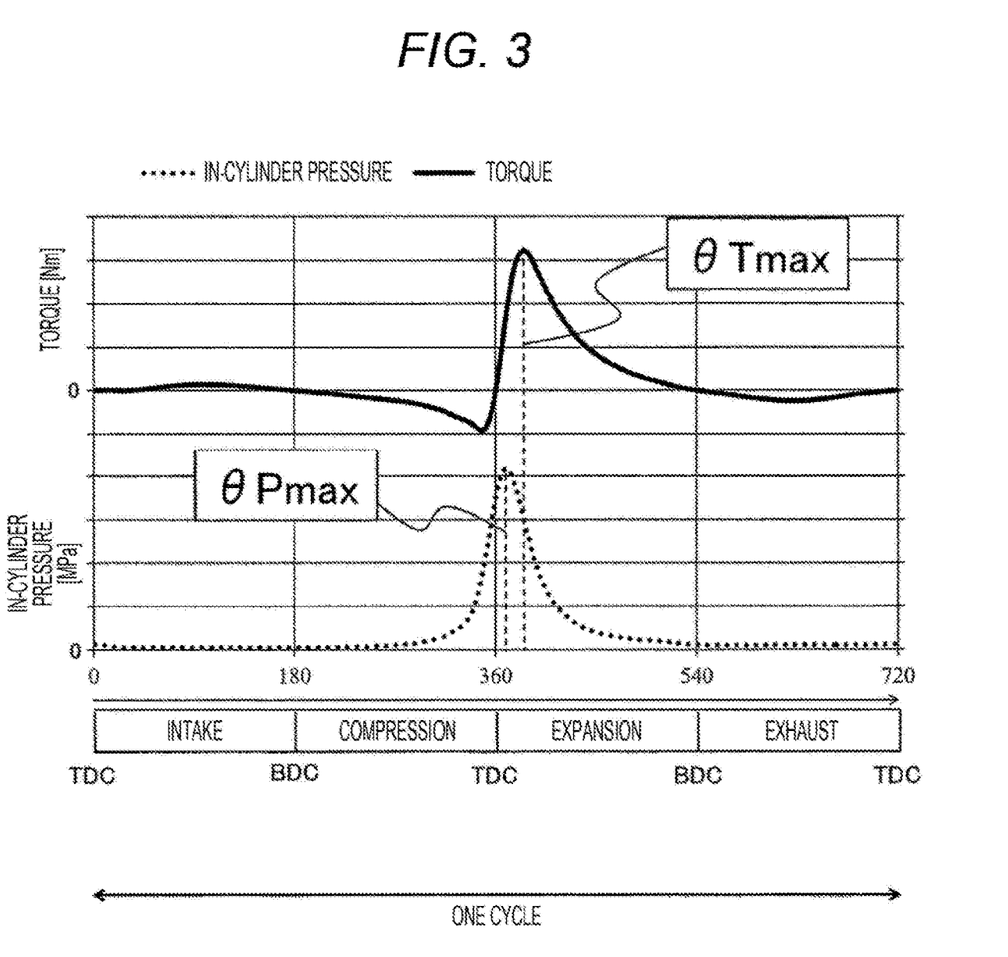
FIG. 3 is a graph indicating in-cylinder pressure and torque for each crank angle in one cylinder according to the first example of the present invention.

FIG. 3 is a graph indicating in-cylinder pressure and torque for each crank angle in one cylinder, which are detection target parameters in the present example. First, general changes in in-cylinder pressure will be described. The in-cylinder pressure takes on a value (0.1013 MPa) equivalent to the atmospheric pressure in the intake stroke. In the compression stroke, the air-fuel mixture is compressed by the piston and the in-cylinder pressure rises. When the air-fuel mixture is ignited by the spark plug 17 in the vicinity of the top dead center, the combustion is started and the in-cylinder pressure rises sharply. Then, the in-cylinder pressure peaks slightly behind the top dead center, and then, in the expansion stroke, the gas after combustion expands and the in-cylinder pressure decreases. In the exhaust stroke, when the exhaust valve 22 is opened, the in-cylinder pressure is reduced to the atmospheric pressure. Next, general changes in torque will be described. The torque performs negative work to suck air in the intake stroke, and further performs negative work to compress the air-fuel mixture in the compression stroke. At the top dead center, the torque is always zero because the force transmission efficiency is zero as a piston mechanical characteristic. Likewise, the torque is zero at the bottom dead center. After that, a moment when the piston accelerates most, that is, a torque peak appears at a position after the in-cylinder pressure peak. During the expansion stroke, combustion torque is generated. In the exhaust stroke, the torque performs negative work to scavenge the exhaust. Here, the crank angle at which the in-cylinder pressure peaks is defined as θPmax, and the crank angle at which the torque peaks is defined as θTmax.

Figure 4:
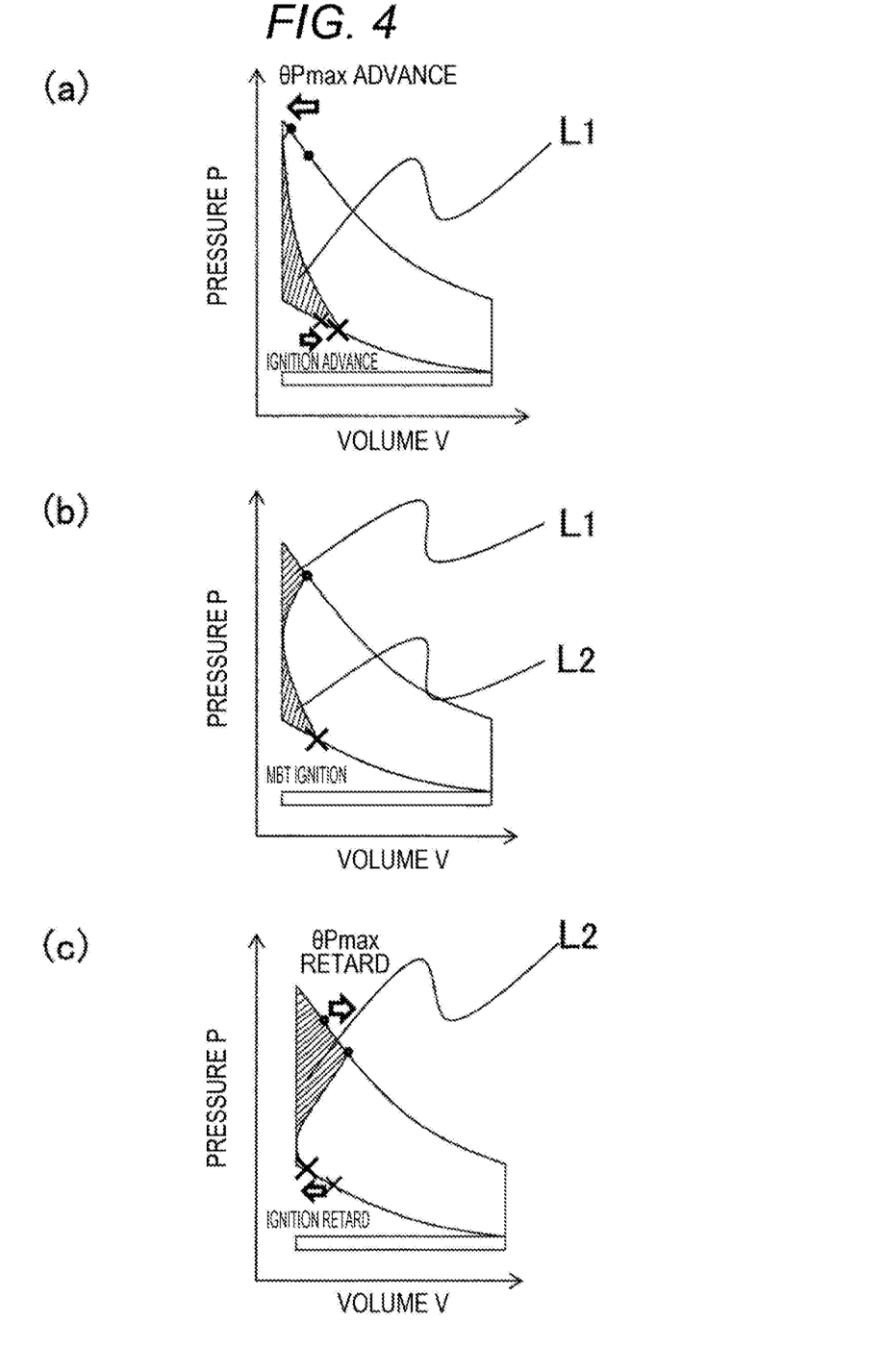
FIG. 4 is a graph indicating the relationship between in-cylinder pressure and in-cylinder volume, which illustrates a mechanism for generating an optimum fuel efficiency point according to the first example of the present invention.

FIG. 4 is a diagram illustrating the relationship between the in-cylinder pressure and the in-cylinder volume when the ignition timing is advanced from MBT, when ignition is performed at MBT, and when the ignition timing is retarded from MBT according to the present example (P-V diagram). The mechanism of changes in θPmax and θTmax with respect to ignition timing change will be described using this P-V diagram.

In the theoretical combustion cycle of a gasoline engine, changes in pressure and volume are seen as illustrated in FIG. 4. At this time, of the part surrounded by a curve line, the area obtained by subtracting the area of the lower region from the area of the upper region indicates the work of the internal combustion engine. In an actual cycle, since flame propagation takes time, it is necessary to perform ignition before the top dead center. This generates a loss shown by the hatched portion in the diagram. FIG. 4(a) illustrates the case where the ignition is advanced more than the MBT, and L1 indicates a loss due to the generation of a combustion pressure that pushes the piston downward while the piston is rising. The loss L1 increases more as the ignition timing is advanced. Even if the region L1 increases, the torque peak position θTmax after the top dead center does not change because only the torque before the compression top dead center decreases. On the other hand, FIG. 4(c) illustrates the case where the ignition is retarded from the MBT, and L2 indicates a loss due to the absence of a combustion pressure that pushes the piston downward while the piston is descending. The loss L2 increases more as the ignition timing is retarded. As the L2 region increases, the torque after the compression top dead center decreases, and the torque peak position θTmax after the top dead center is also retarded. FIG. 4(b) illustrates the case in which ignition is performed at the MBT, where the sum of the losses L1 and L2 is minimum, that is, the work in one cycle is maximum. In this case, the areas of L1 and L2 are generally equal, and two types of losses are evenly distributed before and after the top dead center.

When the ignition timing is advanced from the MBT, the ratio of L1 which is not sensitive to the change of θTmax is high. Conversely, when the ignition timing is retarded from the MBT, the ratio of L2 which is sensitive to the change of θTmax is high. That is, since the loss L1 is dominant in the state in which the ignition timing is advanced from the MBT, the change of θTmax with respect to the ignition timing change is small. Conversely, since the loss L2 is dominant in the state in which the ignition timing is retarded from the MBT, the change in θTmax with respect to the ignition timing change is large. Therefore, when θTmax is observed while changing the ignition timing from the advance side to the retard direction, the rate of change in θTmax with respect to the ignition timing becomes large at the ignition timing closer to the retard side than the MBT. Accordingly, the MBT can be estimated from the change in θTmax.

Also, even if the ignition timing is changed from the retard side to the advance side, an inflection point similarly appears.

Figure 5:
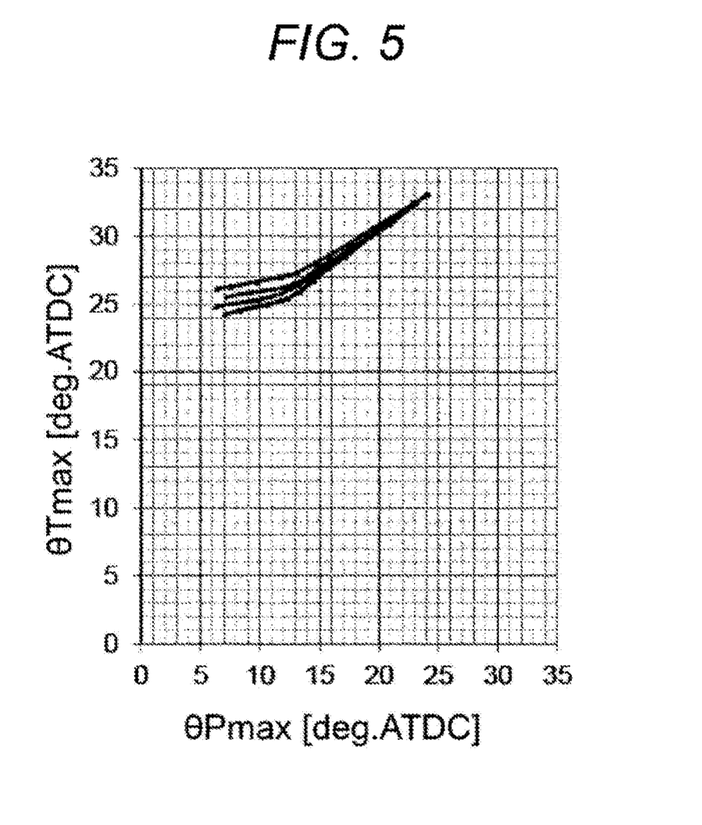
FIG. 5 is a graph indicating the relationship between a crank angle at the peak of the in-cylinder pressure and a crank angle at the torque peak according to the first example of the present invention.

FIG. 5 is the plot of changes in two parameters, the in-cylinder pressure peak position θPmax on the lateral axis and the torque peak position θTmax on the vertical axis, for four cylinders with ignition timings distributed. The slope of θTmax changing in the ignition timing is not constant. As the ignition timing is retarded, the slope at which θTmax changes in the retard direction increases in a quadratic curve. This is because when the ignition timing is retarded, the in-cylinder pressure rises gently, and the in-cylinder pressure peak position is further retarded. Accordingly, θTmax also shifts to the retard direction, and its slope increases. When θTmax changes in a quadratic curve, it becomes difficult to detect the inflection point accurately at the time of passage through the MBT.

Therefore, as illustrated in FIG. 5, a two-dimensional plot is made with the in-cylinder pressure peak position θPmax on one axis and the torque peak position θTmax on the other axis. This cancels out the components of the quadratic curve and makes linear the parts other than the inflection point, so that the inflection point can be easily detected. This mechanism is applicable to the combustion of a one-peak in-cylinder pressure waveform in which the in-cylinder pressure reaches a peak after the compression top dead center, and is also applicable to lean combustion and a combustion state in which EGR gas is introduced.

Figure 6:
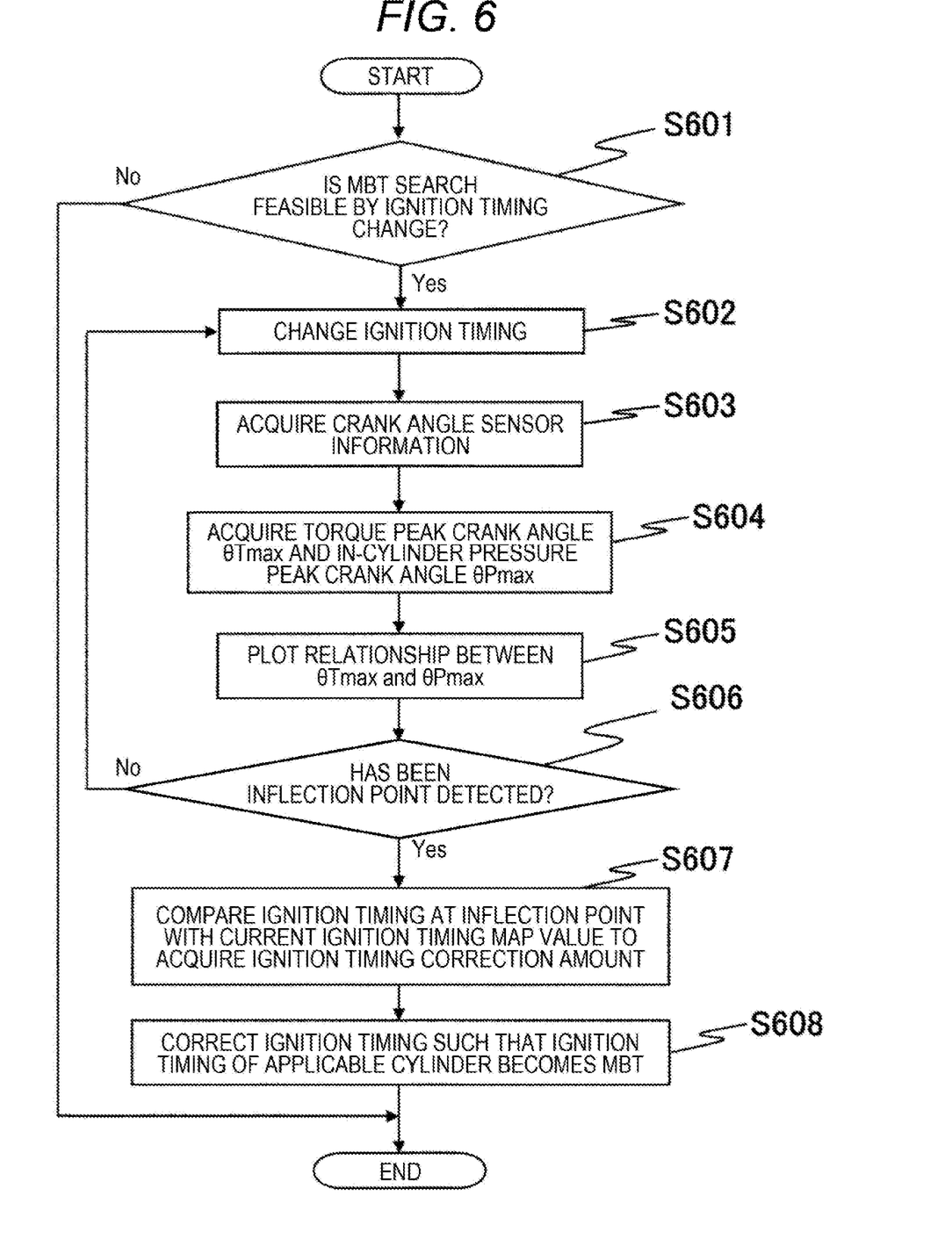
FIG. 6 is a system block diagram illustrating an example of ignition timing correction control according to the first example of the present invention.

FIG. 6 is a system block diagram illustrating an example of fuel injection timing correction control according to the present example. In the case of an engine in which the ignition timing is pre-stored to be the same among all the cylinders, some of the cylinders are not ignited at the MBT due to the cylinder variations. In addition, even in the initial state, even if each of the cylinders performs MBT combustion, the MBTs of the cylinders may be shifted by the temporal change of the flowing state due to deposits on the intake pipe or the like. Therefore, during engine operation, for example, during idling after engine start, or while coasting with the accelerator off, the MBT of each of the cylinder is estimated with changes in the ignition timing. That is, with changes in the ignition timing as described above in such an operation period, the two-dimensional plot is made with the in-cylinder pressure peak position θPmax on one axis and the torque peak position θTmax on the other axis. Then, the MBT of each of the cylinder is estimated from the inflexion point appearing in the plot.

The processing in each step will be described. In S601, it is determined whether MBT search with the ignition timing change is feasible. The MBT search is not to be executed if the MBT control condition is not satisfied, such as in a cold state, or if there is a risk of occurrence of a torque step or a misfire by changing the ignition timing. When the MBT search is feasible, the ignition timing is changed to at least one of the advance direction and the retard direction in S602. In S603, information of a crank angle sensor is acquired, and in S604, based on the information of the crank angle sensor, the torque peak crank angle θTmax and the in-cylinder pressure peak crank angle θPmax are acquired. When crankshaft angular velocity ω is obtained by the crank angle sensor, combustion torque $\tau_{comb}$ is represented by equation (1) below:

$$J\dot{\omega}\tau_{comb}+\tau_{fric}+\tau_{inner}+\tau_{load} \qquad \text{[Mathematical formula 1]}$$

where $\tau_{fric}$, $\tau_{fric}$, and $\tau_{load}$ represent friction torque, inertia torque, load torque, and J represents inertia of the engine rotation system. In order to obtain the combustion torque, it is necessary to calculate the derivative ω̇ of the angular velocity. However, ω measured by the crank angle sensor contains various noises, and performing the normal differentiation will emphasize these noises. Thus, it is not possible to reproduce an accurate torque waveform. Therefore, to avoid emphasis of the noises due to the differentiation, torque may be estimated using the result of cutting radio frequency components included in ω.

Also, since the estimated torque includes an offset due to friction torque and load torque, the offset is canceled out using geometric features of the connecting rod of the four-cylinder engine. When the piston position of the engine is at the top dead center or the bottom dead center, the torque is zero because the cylinder pressure cannot transmit power to the crankshaft. This property is used to correct the estimated torque offset. If the estimated torque at the top dead center the bottom dead center (crank angle is $\theta_1$) is $\tau_1$ and the estimated torque at the next top dead center or lower dead store (crank angle is $\theta_1$) is $\tau_2$, then the correction torque between $\theta_1$ and $\theta_2$ is represented by equation (2) below. This is the final combustion torque estimate.

$$\tau_{compensation} = \tau_1 \frac{\theta_2 - \theta}{\theta_2 - \theta_1} + \tau_2 \frac{\theta - \theta_1}{\theta_2 - \theta_1} \qquad \text{[Mathematiical formula 2]}$$

The offset is canceled out using the mechanical features of a four-cylinder engine. However, this correction is not applicable to cylinders of which torque does not become zero at the top dead center and bottom dead center, such as a three-cylinder engine. Nevertheless, θTmax does not occur near the piston top dead center and bottom dead center, the influence on the estimation accuracy of θTmax is small even if the offset correction of the equation (2) is not performed. Therefore, θTmax can be defined directly by equation (3). The torque peak position in one cycle is defined as θTmax by equation (3) below.

$$\theta T_{max}=\text{Max}(\tau_{compensation}) \qquad \text{[Mathematical formula 3]}$$

Next, the in-cylinder pressure is calculated from the obtained torque. The relationship between the torque and the in-cylinder pressure $P_{comb}$ is determined in a piston mechanical manner, and is expressed by equation (4) below:

$$P_{comb} = \frac{T_{compensation} \cos\theta}{A_{cyl} R \sin(\theta + \varphi)} \qquad \text{[Mathematiical formula 4]}$$

where $A_{cyl}$ represents a cylinder cross-sectional area, R represents a crank arm length, and φ represents an angle between the crank arm and the central axis. The in-cylinder pressure peak position θPmax is defined by equation (5) below:

$$\theta P_{max} = \text{Max}(P_{comb}) \qquad \text{[Mathematical formula 5]}$$

The sensor for acquiring θTmax and θPmax is not limited to the crank angle sensor. θTmax and θPmax may be calculated by using detection values of an in-cylinder pressure sensor or a torque sensor. Alternatively, θTmax and θPmax may be detected by other detection means.

In S605, pluralities of plots of estimated θTmax and θPmax are made. In S606, the presence or absence of an inflection point is detected. When the inflection point is detected, the ignition timing at the inflection point is compared with the current ignition timing MAP value, thereby to acquire an ignition timing correction value in S607. Then, in S608, the ignition timing is corrected so that the ignition timing of the cylinder becomes MBT. For example, when the estimated MBT is in the advance direction relative to the current ignition timing MAP value, the ignition timing of the cylinder is advanced from the MAP value. When no inflection point is detected, the process returns to S602, the ignition timing is changed again, and the loop of S602 to S606 is repeated until the inflection point is detected in S606.

As described above, the control device (ECU 20) of the internal combustion engine according to the present example includes the control unit (CPU) that estimates the optimum ignition timing (MBT) of each of cylinders from the relationship between the phase angle (θTmax) at which the torque peaks with respect to the ignition timing of the cylinder and the phase angle (θPmax) at which the in-cylinder pressure peaks with respect to the ignition timing of the cylinder.

The control unit (CPU) of the control device (ECU 20) changes each ignition timing during engine operation, and plots the crank angle at which the in-cylinder pressure peaks during combustion of a certain cylinder and the crank angle at which combustion torque peaks on a two-dimensional map. The control unit (CPU) desirably sets the ignition timing when the slope of the combustion torque peak crank angle with respect to in-cylinder pressure peak crank angle changes to a preset value or more, as an estimated value of the optimum ignition timing (MBT).

The control unit (CPU) of the control device (ECU 20) corrects a combustion parameter based on the estimated optimum ignition timing (MBT). It is desirable that the combustion parameter corrected here is at least one or more of the ignition timing, the fuel injection amount, the ignition energy, the setting parameter of the variable compression ratio mechanism, and the EGR valve opening in the cylinder to be corrected. It is also desirable that the control unit (CPU) of the control device (ECU 20) estimates the optimum ignition timing for each of the cylinders.

As described above, changing the ignition timing, estimating the MBT for each of the cylinders, and correcting the ignition timing during idling after engine start or coasting with the accelerator off makes it possible to decrease MBT variations in mass production and differences in MBT among the cylinders due to time degradation in the amount of intake air, thereby achieving reduction in control margin and fuel consumption.

In the present example, the accelerator is off, that is, the vehicle does not require the engine torque. However, data may be acquired with the ignition timings distributed while running, or data acquired at the accelerator-off time may be stored to predict the correction value of the combustion parameter under other driving conditions.

Second Example

Hereinafter, a configuration and operations of a control device for engine according to a second example of the present invention will be described below with reference to FIG. 7. The engine system configuration of the second example is the same as that illustrated in FIGS. 1 and 2 of the first example, so the description thereof will be omitted.

Figure 7:
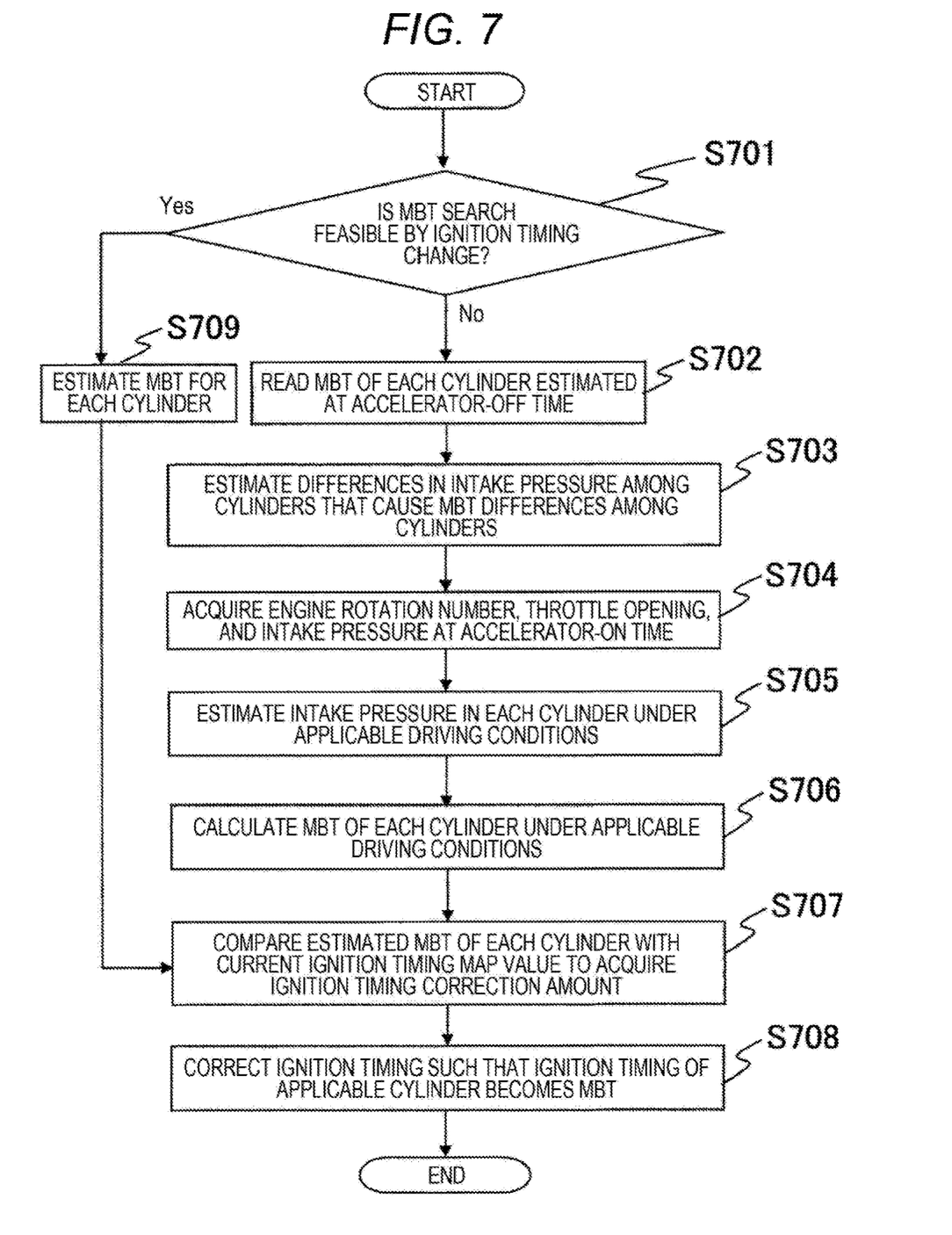
FIG. 7 is a system block diagram illustrating an example of fuel injection timing correction control based on learning data with an accelerator off according to a second example of the present invention.

FIG. 7 is a system block diagram illustrating an example of fuel injection timing correction control at an accelerator-on time, based on learning data at the accelerator-off time, according to the present example.

In MBT search based on the present example, torque fluctuation occurs by changing the ignition timing.

When the torque fluctuation due to the ignition timing change can be suppressed by changing the throttle opening or the like, MBT search is possible even at an accelerator-on time. However, when the torque fluctuation due to the ignition timing change cannot be suppressed, it is difficult to perform this estimation because the driver's ride comfort would become worse. Therefore, in the operating state where the main estimation cannot be performed, the MBT differences among the cylinders in the operating state are estimated based on the data learned at the accelerator-off time.

In S701, it is determined whether MBT search with the ignition timing change is feasible. When the MBT search is feasible, the ignition timings are changed to estimate the MBT for each of the cylinders, and the MBT differences among the cylinders are stored in S709. When the MBT search is not enabled, the MBT for each of the cylinders estimated at the accelerator-off time is read out in S702. In S703, differences in the intake pressure among the cylinders generating MBT differences among the cylinders are estimated using combustion simulations and experimental results. This corresponds to conversion of the MBT differences among the cylinders varying depending on the operating conditions, into parameters with which maintain the relative relationships among the cylinders even with a change in the operating conditions. In this case, the intake pressure is used as a parameter representing the strength of the flow, but another parameter may be used to represent the differences in flow among the cylinders.

In S704, sensors are used to acquire the engine speed, the throttle opening, and the intake pressure at the accelerator-on time. In S705, based on the relative differences in the intake pressure among the cylinders estimated in S702, the intake pressures of the cylinders are estimated so that the intake pressure stored in S704 becomes an average value among the cylinders. In S706, the MBTs of the cylinders are calculated with the intake pressure estimated in S703 as an input value, using again the combustion simulations and experimental results. In S707, the estimated MBTs of the cylinders are compared with the current ignition timing MAP value, thereby to obtain ignition timing correction amounts.

Then, in S708, the ignition timing is corrected for each of the cylinders.

As described above, the control unit (CPU) of the control device (ECU 20) according to the present example desirably estimates the optimum ignition timing of each of the cylinders from the relationship between the phase angle (θTmax) at which the torque peaks with respect to the ignition timing of the cylinder and the phase angle (θPmax) at which the in-cylinder pressure peaks with respect to the ignition timing of the cylinder at the accelerator-off time. The control unit (CPU) also corrects the ignition timings to be the estimated optimum ignition timings at the accelerator-off time. Then, the control unit (CPU) estimates the optimum ignition timings at the accelerator-on time after the accelerator-off based on the estimated optimum ignition timings, and corrects the ignition timings to become the estimated optimum ignitions at the accelerator-on time.

As described above, by estimating the MBT for each of the cylinders at the accelerator-off time, and converting the MBT differences among the cylinders varying depending on the operating conditions into parameters that maintain the correlations among the cylinders even with a change in the operating conditions, and then estimating the MBT differences among the cylinders at the accelerator-on time, it is possible to reduce the MBT differences among the cylinder even in other operating regions by data only at the accelerator-off time without constantly performing MBT estimation, thereby achieving control margin reduction and fuel consumption improvement.

Third Example

A configuration and operations of a control device for an engine according to a third example of the present invention will be described. The engine system configuration is the same as that illustrated in FIGS. 1 and 2 of the first example, so the description will be omitted.

For the MBT for each of the cylinders estimated according to the present invention, the combustion parameter to be changed is not limited to the ignition timing. In the present example, a case where a parameter other than the ignition timing is changed as the combustion parameter will be described.

First, the case of changing the fuel injection amount will be described. With regard to the fuel injection amount, the actual fuel injection amount with respect to the same injection signal decreases due to the aging deterioration such as accumulation of fuel deposits on the tip of the injector and increase in internal resistance of the drive circuit. For example, when the fuel injection amount of the injector of a certain cylinder decreases, the actual air-fuel ratio becomes lean with respect to the air-fuel ratio of the target, and the combustion speed decreases. As a result, the MBT of the cylinder deviates in the advance direction because the ignition timing needs to be advanced. When the MBT fluctuates due to the differences in the air-fuel ratio among the cylinders, the torque generated in the cylinders is different even if the ignition timing alone is changed, which causes the generation of a torque step.

Therefore, when the estimated MBT is advanced with respect to the ignition timing MAP value, the fuel injection amount is increased to correct the air-fuel ratio to the rich side. Then, the combustion speed increases and the MBT shifts to the retard side to approach the ignition timing MAP value. Conversely, when the estimated MBT is retarded with respect to the ignition timing MAP value, the fuel injection amount is decreased to correct the air-fuel ratio to the lean side. Then, the combustion speed decreases and the MBT shifts to the advance side to approach the ignition timing MAP value.

As described above, changing the fuel injection amount with respect to the estimated MBT makes it possible to reduce the differences in MBT among the cylinders caused by the air-fuel ratio variation among the cylinders. This achieves decrease in the control margin and low fuel consumption due to reduction in the combustion variation among the cylinders.

Next, a case of changing the ignition energy will be described. With regard to the ignition energy, the discharge energy for the same ignition signal is decreased by aging deterioration such as increase in the surface resistance due to the surface contamination of the ignition plug and increase in the internal resistance of the drive circuit. For example, when the ignition energy of the ignition device of a certain cylinder decreases, then flame nucleation is impeded and the initial burn rate is reduced. As a result, the heat generation timing of the cylinder is delayed, and thus the ignition timing needs to be advanced by the delay, so the MBT shifts in the advance direction. When the MBT fluctuates due to the differences in the ignition energy among the cylinders, the torque generated in the cylinders is different even if the ignition timing alone is changed, which causes the generation of a torque step.

Therefore, when the estimated MBT is advanced with respect to the ignition timing MAP value, the ignition energy is increased to accelerate the initial combustion. Then, the combustion speed increases and the MBT shifts to the retard side to approach the ignition timing MAP value. Conversely, when the estimated MBT is retarded with respect to the ignition timing MAP value, the ignition energy is reduced to decelerate the initial combustion. Then, the combustion speed decreases and the MBT shifts to the advance side to approach the ignition timing MAP value.

As described above, changing the ignition energy with respect to the estimated MBT makes it possible to reduce the differences in MBT among the cylinders caused by the initial combustion variation among the cylinders. This achieves decrease in the control margin and low fuel consumption due to reduction in the combustion variation among the cylinders.

Next, a case of changing the EGR valve opening degree will be described. As for the EGR valve, more EGR gas is introduced into the cylinder as the opening degree is larger. As for the EGR valve opening degree, control values are pre-stored for each operating condition, but the actual EGR rate with respect to the same EGR valve opening signal fluctuates due to aging deterioration such as actuator deterioration of the EGR valve and seal performance deterioration. For example, when the actual EGR rate becomes larger than the target EGR rate due to the deterioration of the seal performance of the EGR valve, the degree of dilution of the air-fuel mixture increases and the combustion speed decreases. As a result, the heat generation timing is delayed in each of the cylinders, and the MBT is shifted in the retard direction. If the EGR rate becomes larger than the target value, the combustion fluctuation rate becomes large, and there is a possibility that the fuel consumption reduction effect cannot be obtained even if the ignition timing of each of the cylinders is set to the MBT.

Therefore, when the MBT estimated in each of the cylinders is advanced with respect to the ignition timing MAP value, the EGR opening degree is made small to decrease the EGR rate. Then, the MBT position is retarded by the increase of the combustion speed, and approaches the ignition timing MAP value. Conversely, when the MBT estimated in each of the cylinders is advanced with respect to the ignition timing MAP value, the EGR opening degree is made large to increase the EGR rate. Then, the MBT position is advanced due to the decrease in the combustion speed, and approaches the ignition timing MAP value.

As described above, changing the EGR valve opening degree with respect to the estimated MBT makes it possible to suppress an increase in the combustion fluctuation of each of the cylinders due to the deviation of the EGR rate, and increase the effect of reducing fuel consumption by correcting the ignition timing of each of the cylinders.

Next, a case of changing the valve timing will be described. As for the valve timing, when the valve opening timing of the intake valve (IVO) is advanced from the top dead center or the valve closing timing of the exhaust valve (EVC) is advanced from the top dead center, the EGR gas remains in the cylinder, or remains in the intake pipe and is introduced into the cylinder in the next cycle. The control value of the valve timing is pre-stored for each operating condition. However, when the actual EGR rate becomes larger than the target EGR rate due to deterioration in seal performance of the intake and exhaust valves or the like, the degree of dilution of the air-fuel mixture increases, thereby to lower the combustion speed. As a result, the heat generation timing of each of the cylinders is delayed, and thus the ignition timing needs to be advanced by the delay, so the MBT shifts in the advance direction. If the EGR rate becomes larger than the target value, the combustion fluctuation rate becomes large, and there is a possibility that the fuel consumption reduction effect cannot be obtained even if the ignition timing of each of the cylinders is set to the MBT.

Therefore, when the MBT estimated in each of the cylinders is advanced with respect to the ignition timing MAP value, the IVO is changed to the value after the top dead center or to the retard side from the MAP value. Alternatively, the EVC is changed to the value after the top dead center or to the retard side from the MAP value. Then, the EGR rate decreases, and the MBT position is retarded due to the increase of the combustion speed and approaches the ignition timing MAP value.

Conversely, when the MBT estimated for each of the cylinders is retarded with respect to the ignition timing MAP value, the IVO is changed to the value before the top dead center or to the advance side from the MAP value. Alternatively, the EVC is changed to the value before the top dead center or to the advance side from the MAP value. Then, the EGR rate increases, and the MBT position is advanced due to the decrease of the combustion speed and approaches the ignition timing MAP value.

As described above, changing the valve timing with respect to the estimated MBT makes it possible to suppress an increase in the combustion fluctuation of each of the cylinders due to the deviation of the EGR rate, and increase the effect of reducing fuel consumption by correcting the ignition timing of each of the cylinders.

Next, a case of changing the throttle valve opening will be described.

In the case of an engine with a general variable valve timing, when the IVO is changed, the closing timing of the intake valve (IVC) is also changed at the same time. When the IVC moves away from the bottom dead center, the actual compression ratio decreases and the generated torque decreases. Thus, when the IVC moves away from the bottom dead center, the throttle valve opening is raised to increase the amount of intake air, thereby securing the torque. Conversely, when the IVC approaches the bottom dead center and the actual compression ratio increases, the throttle valve opening is lowered to decrease the amount of intake air, thereby preventing the torque from becoming excessive.

Similarly, when the EVC is changed, the opening timing of the exhaust valve (EVO) is also changed at the same time. When the ECO moves away from the bottom dead center, the actual expansion ratio decreases and the generated torque decreases. Thus, when the EVO moves away from the bottom dead center, the throttle valve opening is raised to increase the amount of intake air, thereby securing the torque. Conversely, when the EVO approaches the bottom dead center and the actual expansion ratio increases, the throttle valve opening is lowered to decrease the amount of intake air, thereby preventing the torque from becoming excessive.

As described above, changing the throttle valve opening with respect to the estimated MBT makes it possible to suppress the increase and decrease of the torque caused by the valve timing change, and to increase the effect of reducing fuel consumption by correcting the ignition timing of each of the cylinders.

Next, a case of operating a gas flow device will be described.

The gas flow device is a device that reinforces an air flow individually for each cylinder or uniformly for all cylinders. Examples of the gas flow device include a tumble control valve that is attached to the inner wall of an intake port to narrow the intake flow path and increase a tumble flow rate, and a swirl control valve that increases a swirl flow rate. When the air flow rate is increased using the gas flow device, the combustion speed of the air-fuel mixture is accelerated due to the increase of turbulent energy, and the ignition timing can be retarded by that amount, and the MBT position is further moved to the retard side.

When the MBT estimated for each of the cylinders is advanced with respect to the ignition timing MAP value, the gas flow device is operated to reinforce the air flow. Then, the MBT position is retarded by the increase of the combustion speed, and approaches the ignition timing MAP value.

As described above, operating the gas flow device with respect to the estimated MBT makes it possible to suppress the increase in combustion fluctuation caused by the insufficient flow of each of the cylinders, and to increase the effect of reducing fuel consumption by correcting the ignition timing of each of the cylinders.

Besides, the flow may be reinforced for each of the cylinders by one-way valve stop in each of the cylinders with a plurality of intake valves, gas injection into each of the cylinders by an existing injector or an additional injector, or the like.

Next, a case of changing the compression ratio will be described.

At a higher compression ratio, the theoretical thermal efficiency is more improved, but the probability of occurrence of knocking increases.

Therefore, a variable compression ratio mechanism capable of changing the compression ratio depending on the operating state is used in general. However, the actual compression ratio may vary with respect to the target compression ratio due to mechanical errors of the variable compression ratio mechanism, errors in sensing the actual compression ratio, or the like. If the actual compression ratio is higher than the target compression ratio, there is a risk of engine breakage due to the occurrence of knocking. Thus, the MAP value of the compression ratio is set on the low compression ratio side taking a safety margin from the knocking limit. On the other hand, when the actual compression ratio is lower than the target compression ratio, the fuel consumption is deteriorated due to the decrease in theoretical thermal efficiency.

To sum up the relationship between the actual compression ratio and the MBT position, when the actual compression ratio is higher than the target compression ratio, the temperature of the air-fuel mixture near the compression top dead center rises, and the combustion speed increases. Thus, the ignition timing can be retarded by the increase and the MBT is shifted to the retard direction. In addition, when the actual compression ratio is lower than the target compression ratio, the combustion speed becomes lower, so the MBT moves in the advance direction.

Therefore, when the MBT estimated for each of the cylinders is advanced with respect to the ignition timing MAP value, it is determined that the actual compression ratio is shifted to a lower direction than the target compression ratio, and the target compression ratio is increased. Then, the MBT position is retarded by the increase of the combustion speed, and approaches the ignition timing MAP value. Conversely, when the MBT estimated for each of the cylinders is retarded with respect to the ignition timing MAP value, the target compression ratio is lowered. Then, the MBT position is advanced due to the decrease in the combustion speed, and approaches the ignition timing MAP value.

Thus, changing the compression ratio with respect to the estimated MBT allows combustion at an actual compression ratio close to the target compression ratio in each of the cylinders. This makes it possible to suppress a decrease in theoretical thermal efficiency caused by a control error of the compression ratio and reduce fuel consumption.

The present invention is not limited to the foregoing examples but includes various modification examples. For example, the foregoing examples are described in detail for easy comprehension of the present invention and is not necessarily limited to the one including all the components described above. In addition, some of components of an example can be replaced with components of another example, and components of an example can be added to components of another example. Some of components in the foregoing examples may be added to other components, deleted, or replaced by other components.

REFERENCE SIGNS LIST

1 air flow sensor
2 electronically controlled throttle
4 supercharger
4a compressor
4b turbine
5a intake-side variable valve timing mechanism
5b exhaust-side variable valve timing mechanism
6 intake pipe
7 intercooler
9 air-fuel ratio sensor
10 three-way catalyst
11 wastegate valve
12 accelerator position sensor
13 in-cylinder direct fuel injector
14 intake pressure sensor
15 cylinder
16 exhaust pipe
17 spark plug
18 piston
19a, 19b in-cylinder pressure sensor
20 ECU
21 intake valve
22 exhaust valve
40 EGR pipe
41 EGR valve
42 EGR cooler
43 differential pressure sensor
44 EGR temperature sensor
45 intercooler bypass valve A
46 intercooler bypass valve B
47 intercooler bypass flow path
48 crankshaft
49 crank angle sensor
100 engine

The invention claimed is:

1. A control device for an internal combustion engine comprising:
   a control unit (CPU) that estimates an optimum ignition timing of each of cylinders from a relationship between a phase angle ($\theta$Tmax) at which a torque peaks and a phase angle ($\theta$Pmax) at which an in-cylinder pressure peaks with respect to the ignition timing of the cylinder;
   wherein the control unit changes each ignition timing during engine operation, and plots a crank angle at which the in-cylinder pressure peaks during combustion of a certain cylinder and a crank angle at which combustion torque peaks on a two-dimensional map, and sets the ignition timing when a slope of the combustion torque peak crank angle with respect to in-cylinder pressure peak crank angle changes, as an estimated value of the optimum ignition timing.

2. The control device for the internal combustion engine according to claim 1, wherein the control unit corrects a combustion parameter based on the estimated optimum ignition timing.

3. The control device for the internal combustion engine according to claim 2, wherein the combustion parameter to be corrected is at least one or more of ignition timing, fuel injection amount, ignition energy, preset parameter of a variable compression ratio mechanism, and EGR valve opening in the cylinder to be corrected.

4. The control device for the internal combustion engine according to claim 3, wherein the control unit estimates the optimum ignition timing for each of the cylinders.

5. The control device for the internal combustion engine according to claim 1,
   wherein the control unit estimates the optimum ignition timing of each of the cylinders from the relationship between the phase angle ($\theta$Tmax) at which the torque peaks and the phase angle ($\theta$Pmax) at which the in-cylinder pressure peaks with respect to the ignition timing of the cylinder at an accelerator-off time.

6. The control device for the internal combustion engine according to claim 5,
   wherein the control unit corrects the ignition timing to be the estimated optimum ignition timing at the accelerator-off time.

7. A control device for an internal combustion engine comprising:
   a control unit (CPU) that estimates an optimum ignition timing of each of cylinders from a relationship between a phase angle ($\theta$Tmax) at which a torque peaks and a phase angle ($\theta$Pmax) at which an in-cylinder pressure peaks with respect to the ignition timing of the cylinder;
   wherein the control unit estimates the optimum ignition timing of each of the cylinders from the relationship between the phase angle ($\theta$Tmax) at which the torque peaks and the phase angle ($\theta$Pmax) at which the in-cylinder pressure peaks with respect to the ignition timing of the cylinder at an accelerator-off time; and wherein the control unit estimates an optimum ignition timing at an accelerator-on time after the accelerator off time based on the estimated optimum ignition timing at the accelerator-off time, and
corrects the ignition timing of each cylinder to become the estimated optimum ignition timing at the accelerator-on time.

* * * * *